US012236617B2

(12) United States Patent
Devor et al.

(10) Patent No.: US 12,236,617 B2
(45) Date of Patent: *Feb. 25, 2025

(54) MEASURING VEHICLE SPEEDS WITH AN UNCALIBRATED CAMERA (71) Applicant: REDFLEX TRAFFIC SYSTEM PTY LTD., South Melbourne (AU)

(72) Inventors: Jonathan Devor, Jerusalem (IL); Moshe Mikhail Frolov, Jerusalem (IL); Igal Muchnik, Mevaseret Tzion (IL); Herbert Zlotogorski, Jerusalem (IL)

(73) Assignee: REDFLEX TRAFFIC SYSTEMS PTY LTD., South Melbourne (AU)

(*) Notice: Subject to any disclaimer, the term of this patent is extended or adjusted under 35 U.S.C. 154(b) by 0 days.

This patent is subject to a terminal disclaimer.

(21) Appl. No.: 18/497,674

(22) Filed: Oct. 30, 2023

(65) Prior Publication Data

US 2024/0062393 A1    Feb. 22, 2024

Related U.S. Application Data (63) Continuation of application No. 17/484,697, filed on Sep. 24, 2021, now Pat. No. 11,803,976.

(30) Foreign Application Priority Data

Sep. 30, 2020   (GB) ..................... 2015434

(51) Int. Cl.
*G06K 9/00*    (2022.01)
*G01P 3/38*    (2006.01)
(Continued)

(52) U.S. Cl.
CPC ................ *G06T 7/251* (2017.01); *G01P 3/38* (2013.01); *G01P 21/02* (2013.01); *G06T 7/536* (2017.01)

(58) Field of Classification Search
CPC ..................... G06T 7/251; G06T 7/536; G06T 2207/30236; G06T 2207/30248;
(Continued)

(56) References Cited

U.S. PATENT DOCUMENTS 5,809,161 A * 9/1998 Auty ...................... G08G 1/054
                                                              382/104
6,753,902 B1 * 6/2004 Kashiwazaki ....... G05D 1/0274
                                                              382/104
(Continued)

FOREIGN PATENT DOCUMENTS

AU    2018421458 A1   12/2019
CN     111612849 A     9/2020
(Continued)

OTHER PUBLICATIONS

U.S. Appl. No. 17/484,697, Notice of Allowance, Jun. 16, 2023, 8 pages.
(Continued)

*Primary Examiner* — Shervin K Nakhjavan
(74) *Attorney, Agent, or Firm* — Dorsey & Whitney LLP (57) ABSTRACT Measuring speed of a vehicle in a road environment. During calibration, multiple images are captured of a calibration vehicle traveling at a known ground speed. A calibration image feature is located in the image of the calibration vehicle. An optical flow of the calibration image feature is computed to determine a model between an image speed of the calibration image feature and the known ground speed of the calibration vehicle. During speed measurement, multiple images are captured of a target vehicle traveling along a road surface at unknown ground speed. A target image feature may be located in an image of the target vehicle. An image speed may be computed of the target image feature. The model may be applied to determine the ground speed of the (Continued)

target vehicle from the image speed of the target image feature.

16 Claims, 4 Drawing Sheets

(51) Int. Cl.
    *G01P 21/02*     (2006.01)
    *G06T 7/246*     (2017.01)
    *G06T 7/536*     (2017.01)

(58) Field of Classification Search
    CPC ........... G06T 7/269; G06T 7/248; G06T 7/80; G06T 7/97; G01P 3/38; G01P 21/02
    See application file for complete search history.

(56) References Cited

U.S. PATENT DOCUMENTS

| | | | |
|---|---|---|---|
| 10,909,845 B2 * | 2/2021 | Bernal | G08G 1/052 |
| 2005/0201593 A1 * | 9/2005 | Sawada | B60W 40/02 |
| | | | 382/104 |
| 2006/0038895 A1 * | 2/2006 | Suzuki | H04N 5/2628 |
| | | | 348/E7.086 |
| 2008/0166023 A1 * | 7/2008 | Wang | G06T 7/20 |
| | | | 356/27 |
| 2009/0208054 A1 * | 8/2009 | Angell | G06Q 90/00 |
| | | | 382/103 |
| 2013/0066542 A1 * | 3/2013 | Chung | G08G 1/04 |
| | | | 701/119 |
| 2015/0008294 A1 * | 1/2015 | Desbordes | G06T 7/20 |
| | | | 246/122 R |
| 2015/0371096 A1 * | 12/2015 | Stein | G06T 7/40 |
| | | | 382/103 |
| 2016/0232410 A1 * | 8/2016 | Kelly | G06V 30/224 |
| 2017/0053173 A1 * | 2/2017 | Yamamoto | G06T 7/246 |
| 2017/0098304 A1 | 4/2017 | Blais-Morin | |
| 2019/0347808 A1 * | 11/2019 | Wong | G06T 7/248 |
| 2019/0353784 A1 * | 11/2019 | Toledano | G01S 17/931 |
| 2020/0322588 A1 * | 10/2020 | Lindgren | B60R 11/04 |
| 2022/0101538 A1 | 3/2022 | Devor et al. | |
| 2022/0118910 A1 * | 4/2022 | Freeman-Powell | H04N 7/181 |
| 2024/0127601 A1 * | 4/2024 | Kim | G06T 7/74 |

FOREIGN PATENT DOCUMENTS

| | | | | |
|---|---|---|---|---|
| DE | 4332612 C2 * | 2/1996 | | B60Q 9/008 |
| EP | 2347931 B1 * | 1/2020 | | B60Q 1/085 |
| FR | 2911713 A1 | 7/2008 | | G08G 5/065 |
| JP | 2005258936 A * | 9/2005 | | B60T 7/22 |
| WO | 20190227865 A1 | 12/2019 | | |

OTHER PUBLICATIONS 2015434.0, Great Britain Search Report, Mar. 25, 2021.
Kim, Jonghyuk, et al., "Dual Optic-flow Integrated Navigation for Small-scale Flying Robots", Proc. of Australasian Conference on Robotics and Automation, Brisbane, Australia, 2017, 7 pages.
Qimin, Xu , et al., "A Methodology of Vehicle Speed Estimation Based on Optical Flow", Proceedings of 2014 IEEE International Conference on Service Operations and Logistics, and Informatics, Oct. 8-10, 2014, pp. 33-37.

* cited by examiner

MEASURING VEHICLE SPEEDS WITH AN UNCALIBRATED CAMERA

CROSS REFERENCE TO RELATED APPLICATION

The present application is a continuation of U.S. patent application Ser. No. 17/484,697, filed Sep. 24, 2021, which claims priority to Great Britain Patent Application No. 2015434.0, filed Sep. 30, 2020, each of which is hereby incorporated by reference herein in its entirety.

BACKGROUND

Technical Field

The present invention relates to usage of traffic cameras for measurement of vehicle speed.

Description of Related Art

Modern speed enforcement involves use of a speed measuring device for measuring vehicle speeds and triggering a camera to capture an image to identify the speeding vehicle and driver to whom a citation may be issued. An accurate vehicle speed measurement is necessary for law enforcement of speeding. A number of methods exist for measuring vehicle speeds. RADAR, "radio detection and ranging", is a technology that uses electromagnetic radio waves to detect moving vehicles and measure their speeds. LiDAR uses pulsed laser light instead of radio waves to measure vehicle speeds. Digital image processing has been suggested for measuring speed of moving vehicles in a road environment.

BRIEF SUMMARY

Various methods and systems are disclosed herein for measuring speed of a vehicle in a road environment. During calibration, multiple images are captured of a calibration vehicle traveling at a known ground speed. A calibration image feature is located in the image of the calibration vehicle. An optical flow of the calibration image feature is computed to determine a model between an image speed of the calibration image feature and the known ground speed of the calibration vehicle. During speed measurement, multiple images are captured of a target vehicle traveling along a road surface at unknown ground speed. A target image feature may be located in an image of the target vehicle. An image speed may be computed of the target image feature. The model may be applied to determine the ground speed of the target vehicle from the image speed of the target image feature. Image speed relative to ground speed may be proportional to a distance from a vanishing point of an image feature and proportional to a vertical image coordinate measured from a vanishing point. Image speed relative to ground speed of the vehicle may be proportional to a horizon slope factor related to camera roll about the horizon and a horizontal image coordinate measured from the vanishing point. The model may be a parameterized model including multiple parameters. The model may be determined by determining the parameters of the model. The parameters of the model may include: a proportionality constant C relating ground speed V to image speed v, image coordinates x0 and y0 of a vanishing point in an image plane, and the horizon slope factor related to camera roll about the horizon.

Various non-transitory computer-readable storage media store instructions that, when executed by a processor, cause the processor to perform a method as disclosed herein.

BRIEF DESCRIPTION OF THE DRAWINGS

The invention is herein described, by way of example only, with reference to the accompanying drawings, wherein.

The foregoing and/or other aspects will become apparent from the following detailed description when considered in conjunction with the accompanying drawing figures.

DETAILED DESCRIPTION

Reference will now be made in detail to features of the present invention, examples of which are illustrated in the accompanying drawings, wherein like reference numerals refer to like elements throughout. The features are described below to explain the present invention by referring to the figures.

By way of introduction, aspects of the present invention are directed to a system and method for accurately measuring the speeds of vehicles along a stretch of road. A planar road model may be assumed. The present method as disclosed herein may be used to retrofit, with only a software upgrade, an existing camera already in use for license plate recognition, by way of example. Speed measurements, according to embodiments of the present invention may be used to monitor local traffic and/or trigger an issuance of a citation for a speeding violation.

Once setup, the system may be used to measure respective speeds of multiple vehicles within the camera's field of view (FOV), simultaneously including vehicles travelling in opposite directions, to and from the camera. The system and method as disclosed herein includes two stages of operation.

(1) An initial calibration stage during which images are captured, i.e., video, of a sample of vehicles travelling at known speeds.

(2) A measurement stage where the system may operate continuously, measuring and logging vehicle speeds in real-time.

Figure 1:
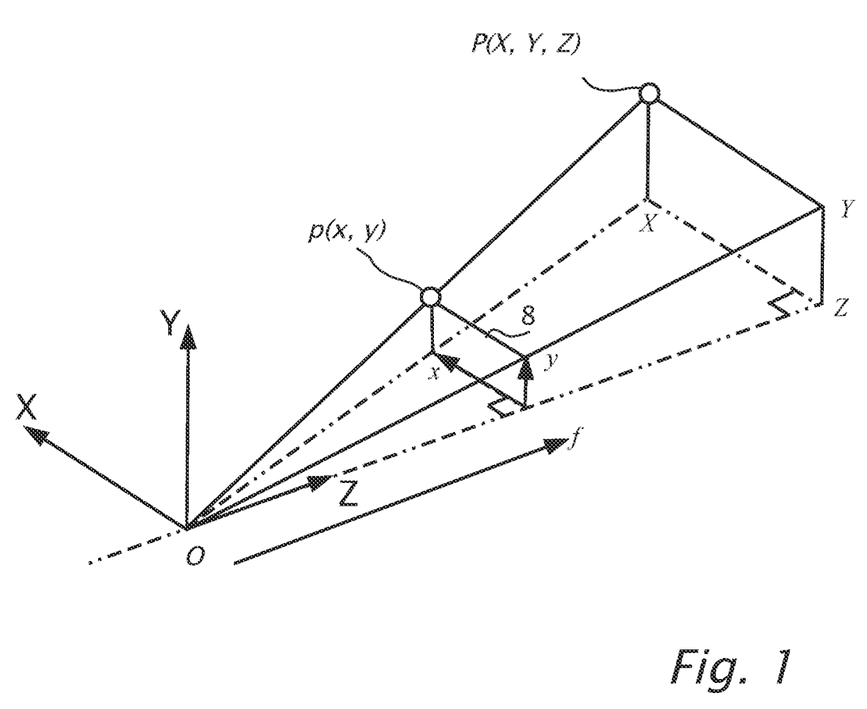
FIG. 1 illustrates a camera or pinhole coordinate system which relates world-space coordinates (X,Y,Z) to image coordinates (x,y)

Referring now to the drawings, reference is now made to FIG. 1 which illustrates camera or pinhole projection which relates a point P(X,Y,Z) in world space Cartesian coordinates to a point p(x,y) image coordinates on image plane 8 where X is the horizontal Cartesian coordinate in world space, Y is the vertical Cartesian coordinate in world space and Z is the direction along the optical axis of the camera. The origin O of camera projection is at the pinhole, image plane 8 is in reality behind the origin at focal length f with the image inverted. Image plane 8 is shown in the projection of FIG. 1 in a symmetric position with a non-inverted image in front of origin O at a distance focal length f so the centre of the image plane 8 is at world space coordinates (0,0,f). The following equations approximate the relation between image coordinates x,y and world space coordinates X,Y,Z assuming camera or pinhole projection:

$$x(t) = f\frac{X(t)}{Z(t)}, y(t) = f\frac{Y(t)}{Z(t)}$$

Figure 2:
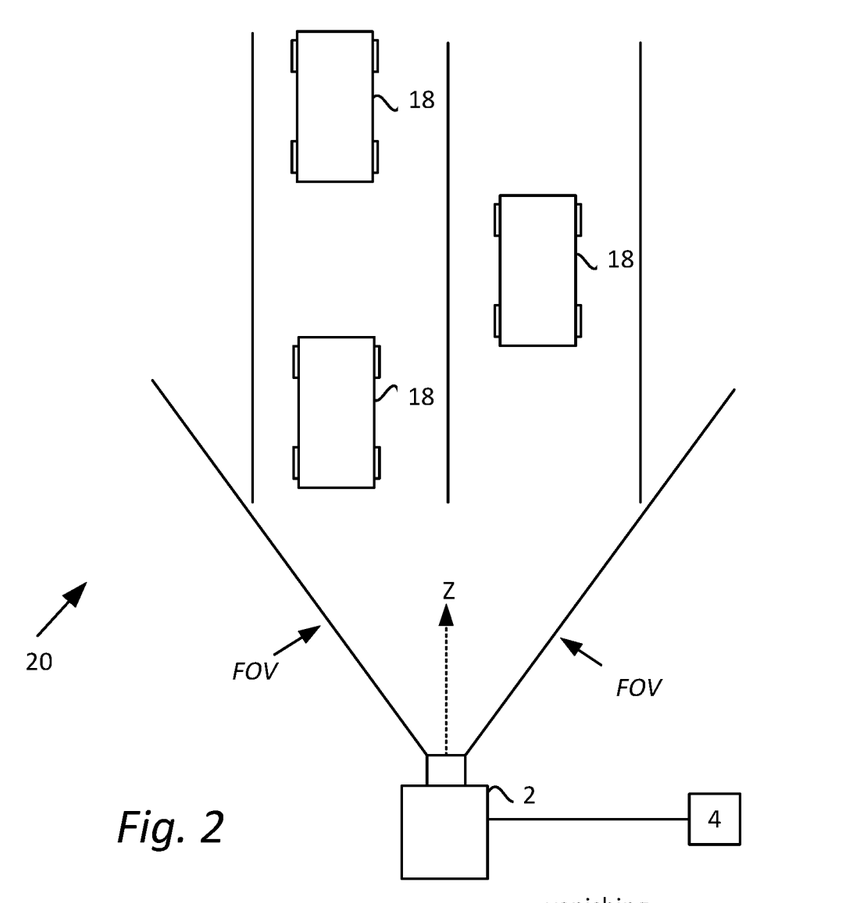
FIG. 2 illustrates schematically a top view of a system including a camera viewing a road environment, according to embodiments of the present invention.

Reference is now also made to FIG. 2, which illustrates schematically a system 20, according to embodiments of the present invention, a view from above of a road environment. System 20 illustrates fixed in a road environment, a camera 2 with field of view (FOV) with the optical axis Z of camera 2 parallel to the direction of motion of vehicles 18. Using the camera coordinate system as shown in FIG. 1, the motion of a vehicle 18 is modelled as starting from (X0, Y0, 0), a point in a plane perpendicular to the camera optical axis, and moving along a straight trajectory in three dimensions, toward a point (X(t), Y(t), Z(t)). The vehicle position is imaged on image plane 8 as being at (x(t), y(t)). A processor 4 is shown connected to camera 2 configured to capture image frames from the road environment.

Figure 2A:
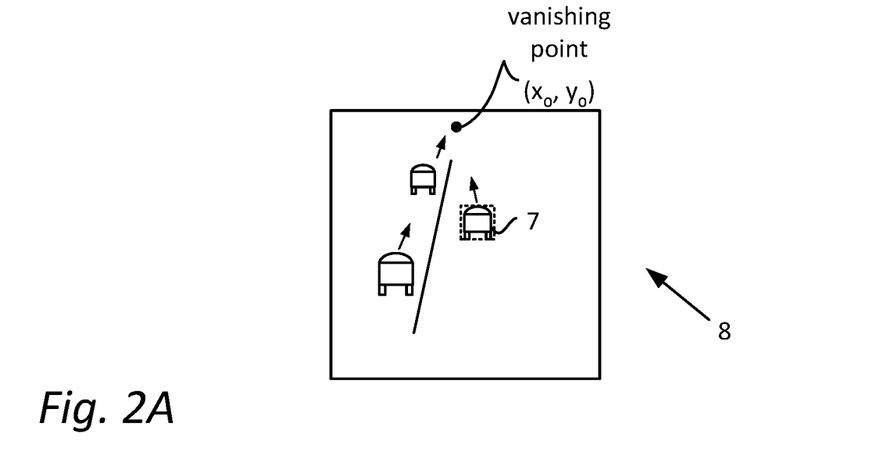
FIG. 2A illustrates an image viewed by the camera in FIG. 2.

Reference is now also made to FIG. 2A which schematically illustrates image plane 8 imaging the road environment as shown in FIG. 2. Vanishing point (x0, y0) is shown, the point on image plane 8 to which the trajectories of vehicle 18 converge as Z(t) approaches infinity. Arrows emanating from images of vehicles 18 moving along the road in the positive Z direction indicate respective image velocity vectors in the direction of the vanishing point. Length of the arrows represents speed v in image space.

Defining image coordinates relative to the vanishing point: Δx=x−x0 and Δy=y−y0, a model relating speed v measured in image space on image plane 8 and ground speed V of the vehicle is a ratio:

$$\frac{v}{V} = C(a\Delta x - \Delta y)\sqrt{((\Delta x)^2 + (\Delta y)^2)} \qquad (1)$$

where C is a proportionality constant and a is a horizon slope factor related to roll angle of the camera about the optical axis. If the camera horizontal x axis is exactly parallel with the horizon, then a=0. Using equation (1), parameters: C, a, x0 and y0 may be determined during the calibration phase when vehicle speed is known. Subsequently, during the measurement stage, equation (1) may be used to determine respective ground speeds V from speed v measurements in image plane 8 of image features of vehicles.

Still referring to FIG. 2A, a bounding box 7 is shown with a broken line tightly fitting an image of a vehicle 18. When using bounding box 7, x' may be defined as the mid-point of bounding box 7 along the horizontal image axis x; and measured relative to vanishing point horizontal coordinate x0 \ is:

Δx'=x'−x0

Similarly, y' may be defined along the vertical image axis y as the bottom of bounding box 7; and relative to the vertical coordinate y0 of the vanishing point is:

Δy'=y'−y0

When using bounding box 7, we can improve upon equation (1) by assuming that the bottom of bounding box 7 is on the road to yield:

$$\frac{v}{V} = C(a\Delta x' - \Delta y')\sqrt{((\Delta x)^2 + (\Delta y)^2)} \qquad (2)$$

Calibration Stage:

Calibration stage is for initial setup which, in some embodiments of the present invention, may include operator supervision. As long as camera 2 remains fixed, the initial setup may be performed only once. There are two purposes to calibration mode: (i) to map regions of the road that are straight and planar without dips or turns, and (ii) to find the model parameters, C, a, x0 and y0.

Figure 3:
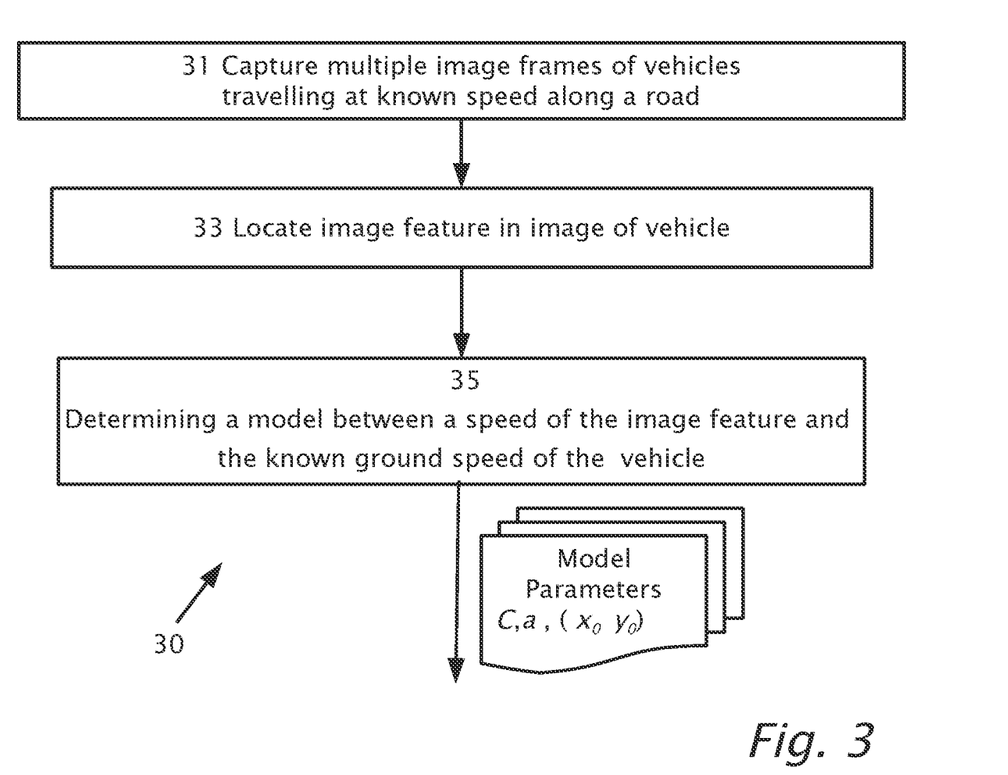
FIG. 3 is a simplified flow diagram of a calibration stage of a method, according to embodiments of the present invention.

Reference is now made to FIG. 3, a flow diagram of a calibration stage 30 according to embodiments of the present invention. Multiple image frames are captured (step 31) of vehicles travelling along a road with known respective speeds. Image features in images of the travelling vehicles are located, (step 33). Image features are tracked between image frames. ORB may be used to match features and track between image frames. (Ethan Rublee, Vincent Rabaud, Kurt Konolige, Gary R. Bradski: ORB: An efficient alternative to SIFT or SURF. ICCV 2011: 2564-2571).

Optical flow of the image features may be computed between two or more image frames to produce a set of motion vectors. Vehicle images may be stabilised by considering optical flow outside the vehicle images, i.e. the part of the image that is not expected to be moving. Any other known methods for stabilization may be used. Spurious optical flow vectors may be filtered out. Spurious optical flow vectors include: vectors that do not emanate or end in a bounding box. Vectors that are too short and represent noise. Motion vectors with directions very different from most of the optical flow vectors or are too long and may represent an optical flow feature mismatch are outliers and preferably filtered out.

Filtered optical flow vectors are input into a model based on equation (1) to optimally determine (step 35) parameters C, a, x0 and y0. Some regions in image plane 8 may consistently have improved fits to the model, other regions may have worse fits to the model. Image plane 8 may be mapped so that better fitting images are used for parameter determination. (step 35)

Speed Measurement Stage

Figure 4:
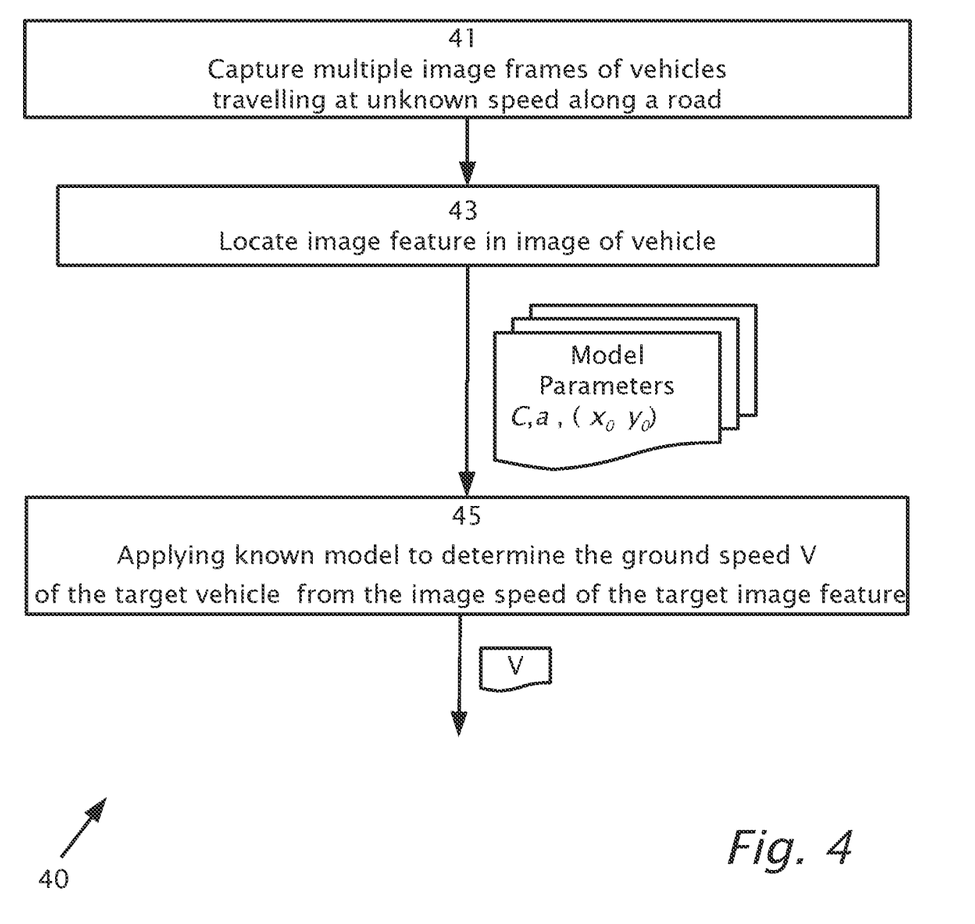
FIG. 4 is a simplified flow diagram of speed measurement method of target vehicles, according to embodiments of the present invention.

Reference is now made to FIG. 4 which is a simplified flow diagram of speed measurement of target vehicles 18, according to embodiments of the present invention. Multiple image frames are captured (step 41) of vehicles travelling along a road with unknown respective speeds. Image features in images of the travelling vehicles are located, (step 43).

As in the calibration stage, similar processing steps may be performed. Target image features are tracked between image frames. Optical flow of the image features may be computed between two or more image frames to produce a set of motion vectors. Vehicle images may be stabilised and spurious optical flow vectors may be filtered out. Filtered optical flow vectors are input into the model based on equation (1) including model parameters C, a, x0 and y0 to optimally determine (step 45) the ground speed V of the target vehicle from the image speeds of the target image features.

The term "image feature" as used herein is one or more portion of an image such as a corner or "blob" and may be detected by any method in the art of digital image processing.

The term "optic flow" or "optical flow" as used herein refers to pattern of apparent motion of image features in image space caused by motion of an object relative to the camera.

The term "image speed" as used herein is the magnitude of an optical flow vector in an image plane divided by time.

The term "calibration" as used herein is not "camera calibration" which generally refers to determining internal camera parameters: e.g., focal length, distortion, and external camera parameters: position coordinates and/or angular coordinates of the camera relative to the road. These camera coordinates are not generally required to be known a priori in the present method. The term "calibration" as used herein refers to the initial stage of the method disclosed herein which uses images of a vehicle travelling at known speed to determine parameters of a model relating ground speed to image speed.

The term "vanishing point" as used herein is a point (x0,y0) in image space to which an image of an object emanates as the object approaches infinite distance from the camera along the positive optical axis.

The transitional term "comprising" as used herein is synonymous with "including," and is inclusive or open-ended and does not exclude additional, unrecited elements or method steps. The articles "a" and "an" are used herein, such as "a vehicle," "an image feature," have the meaning of "one or more," that is "one or more vehicles," "one or more image features."

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

Although selected features of the present invention have been shown and described, it is to be understood the present invention is not limited to the described features.

The invention claimed is:

1. A method comprising:
capturing, with a camera having an optical axis aligned with a road environment, a plurality of images of a calibration vehicle traveling relative to the optical axis within the road environment at a known ground speed;
locating a calibration image feature in an image of the calibration vehicle, wherein the calibration image feature is located with respect to a vanishing point defined in an image plane of the camera where vehicle trajectories in a field of view of the camera converge;
computing an optical flow of the calibration image feature between two or more image frames; and
determining, based on the optical flow of the calibration image feature, a model that relates an image speed of the calibration image feature and the known ground speed of the calibration vehicle,
wherein the model comprises a plurality of parameters, and wherein said determining the model includes determining the plurality of parameters of the model, wherein the plurality of parameters of the model include: a proportionality constant C relating ground speed V to image speed v, image coordinates x0 and y0 of the vanishing point in the image plane, and a horizon slope factor a related to camera roll of the camera about a horizon of the road environment.

2. The method of claim 1, wherein the image speed v relative to the ground speed V is proportional to a distance from the vanishing point of the calibration image feature and proportional to a vertical image coordinate measured from the vanishing point.

3. The method of claim 1, wherein the image speed v relative to the ground speed V is proportional to the horizon slope factor a related to the camera roll about the horizon and a horizontal image coordinate measured from the vanishing point.

4. A method comprising:
capturing, with a camera having an optical axis aligned with a road environment, a plurality of images of a calibration vehicle traveling relative to the optical axis within the road environment at a known ground speed;
locating a calibration image feature in an image of the calibration vehicle, wherein the calibration image feature is located with respect to a vanishing point defined in an image plane of the camera where vehicle trajectories in a field of view of the camera converge;
computing an optical flow of the calibration image feature between two or more image frames, wherein computing the optical flow of the calibration image feature produces a set of optical flow vectors;
determining, based on the optical flow of the calibration image feature, a model that relates an image speed of the calibration image feature and the known ground speed of the calibration vehicle,
wherein the model comprises a plurality of parameters, and wherein said determining the model includes determining the plurality of parameters of the model;
filtering out spurious optical flow vectors of the set of optical flow vectors to obtain filtered optical flow vectors; and
inputting the filtered optical flow vectors into an equation of the model to determine the plurality of parameters.

5. The method of claim 4, wherein the spurious optical flow vectors do not emanate from or end in a bounding box in the image of the calibration vehicle, represent noise, or comprise a direction or a length corresponding to an outlier.

6. The method of claim 4, wherein the equation of the model comprises $$\frac{v}{V} = C(a\Delta x - \Delta y)\sqrt{((\Delta x)^2 + (\Delta y)^2)},$$

where v is the image speed of the calibration image feature, V is the known ground speed of the calibration vehicle, C is a proportionality constant C, a is a horizon slope factor related to camera roll of the camera about a horizon, Δx is a horizontal image coordinate of the calibration image feature relative to the vanishing point in the image plane, and Δy is a vertical image coordinate of the calibration image feature relative to the vanishing point in the image plane.

7. The method of claim 4, further comprising mapping the image plane to determine regions with improved fits to the equation of the model.

8. A method comprising:
  capturing, with a camera having an optical axis aligned with a road environment, a plurality of images of a calibration vehicle traveling relative to the optical axis within the road environment at a known ground speed;
  locating a calibration image feature in an image of the calibration vehicle, wherein the calibration image feature is located with respect to a vanishing point defined in an image plane of the camera where vehicle trajectories in a field of view of the camera converge;
  computing an optical flow of the calibration image feature between two or more image frames;
  determining, based on the optical flow of the calibration image feature, a model that relates an image speed of the calibration image feature and the known ground speed of the calibration vehicle,
  wherein the model comprises a plurality of parameters, and wherein said determining the model includes determining the plurality of parameters of the model; and
  during a speed measurement:
    capturing, with the camera, a plurality of images of a target vehicle traveling relative to the optical axis of the camera along the road environment at an unknown ground speed;
    locating a target image feature in an image of the target vehicle, wherein the target image feature is located with respect to the vanishing point defined in the image plane of the camera;
    computing an image speed of the target image feature; and
    applying the model to determine the ground speed of the target vehicle from the image speed of the target image feature.

9. A device comprising:
  a camera comprising an optical axis aligned to capture images of vehicles traveling within a road environment, wherein a vanishing point is defined in an image plane of the camera where vehicle trajectories in a field of view of the camera converge;
  a processor connected to the camera; and
  a memory accessible by the processor, the memory comprising instructions that, when executed by the processor, cause the processor to:
    capture, with the camera, a plurality of images of a calibration vehicle traveling relative to the optical axis within the road environment at a known ground speed;
    locate a calibration image feature in an image of the calibration vehicle, wherein the calibration image feature is located with respect to the vanishing point in the image plane of the camera;
    compute an optical flow of the calibration image feature between two or more image frames; and
    determine, based on the optical flow of the calibration image feature, a model that relates an image speed of the calibration image feature and the known ground speed of the calibration vehicle,
    wherein the model comprises a plurality of parameters, and wherein to determine the model includes determining the plurality of parameters of the model, wherein the plurality of parameters of the model include: a proportionality constant C relating ground speed V to image speed v, image coordinates x0 and y0 of the vanishing point in the image plane, and a horizon slope factor a related to camera roll of the camera about a horizon of the road environment.

10. The device of claim 9, wherein the image speed v relative to the ground speed V is proportional to a distance from the vanishing point of the calibration image feature and proportional to a vertical image coordinate measured from the vanishing point.

11. The device of claim 9, wherein the image speed v relative to the ground speed V is proportional to the horizon slope factor a related to the camera roll about the horizon and a horizontal image coordinate measured from the vanishing point.

12. A device comprising:
  a camera comprising an optical axis aligned to capture images of vehicles traveling within a road environment, wherein a vanishing point is defined in an image plane of the camera where vehicle trajectories in a field of view of the camera converge;
  a processor connected to the camera; and
  a memory accessible by the processor, the memory comprising instructions that, when executed by the processor, cause the processor to:
    capture, with the camera, a plurality of images of a calibration vehicle traveling relative to the optical axis within the road environment at a known ground speed;
    locate a calibration image feature in an image of the calibration vehicle, wherein the calibration image feature is located with respect to the vanishing point in the image plane of the camera;
    compute an optical flow of the calibration image feature between two or more image frames, wherein computing the optical flow of the calibration image feature produces a set of optical flow vectors;
    determine, based on the optical flow of the calibration image feature, a model that relates an image speed of the calibration image feature and the known ground speed of the calibration vehicle,
    wherein the model comprises a plurality of parameters, and wherein to determine the model includes determining the plurality of parameters of the model;
    filter out spurious optical flow vectors of the set of optical flow vectors to obtain filtered optical flow vectors; and
    input the filtered optical flow vectors into an equation of the model to determine the plurality of parameters.

13. The device of claim 12, wherein the spurious optical flow vectors do not emanate from or end in a bounding box in the image of the calibration vehicle, represent noise, or comprise a direction or a length corresponding to an outlier.

14. The device of claim 12, wherein the equation of the model comprises $$\frac{v}{V} = C(a\Delta x - \Delta y)\sqrt{(\Delta x)^2 + (\Delta y)^2},$$

where v is the image speed of the calibration image feature, V is the known ground speed of the calibration vehicle, C is a proportionality constant C, a is a horizon slope factor related to camera roll of the camera about a horizon, Δx is a horizontal image coordinate of the calibration image feature relative to the vanishing point in the image plane, and Δy is a vertical image coordinate of the calibration image feature relative to the vanishing point in the image plane.

15. The device of claim 12, wherein the instructions further cause the processor to map the image plane to determine regions with improved fits to the equation of the model.

16. A device comprising:
  a camera comprising an optical axis aligned to capture images of vehicles traveling within a road environment, wherein a vanishing point is defined in an image plane of the camera where vehicle trajectories in a field of view of the camera converge;
  a processor connected to the camera; and
  a memory accessible by the processor, the memory comprising instructions that, when executed by the processor, cause the processor to:
    capture, with the camera, a plurality of images of a calibration vehicle traveling relative to the optical axis within the road environment at a known ground speed;
    locate a calibration image feature in an image of the calibration vehicle, wherein the calibration image feature is located with respect to the vanishing point in the image plane of the camera;
    compute an optical flow of the calibration image feature between two or more image frames; and
    determine, based on the optical flow of the calibration image feature, a model that relates an image speed of the calibration image feature and the known ground speed of the calibration vehicle,
  wherein the model comprises a plurality of parameters, and wherein to determine the model includes determining the plurality of parameters of the model; and
  during a speed measurement:
    capture, with the camera, a plurality of images of a target vehicle traveling relative to the optical axis of the camera along the road environment at an unknown ground speed;
    locate a target image feature in an image of the target vehicle, wherein the target image feature is located with respect to the vanishing point defined in the image plane of the camera;
    compute an image speed of the target image feature; and
    apply the model to determine the ground speed of the target vehicle from the image speed of the target image feature.

* * * * *